(12) United States Patent
Ocalan et al.

(10) Patent No.: US 8,890,341 B2
(45) Date of Patent: Nov. 18, 2014

(54) HARVESTING ENERGY FROM A DRILLSTRING

(75) Inventors: Murat Ocalan, Boston, MA (US); Jahir Pabon, Newton, MA (US); Nathan Wicks, Somerville, MA (US); Hitoshi Tashiro, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 175 days.

(21) Appl. No.: 13/560,454

(22) Filed: Jul. 27, 2012

(65) Prior Publication Data

US 2013/0026766 A1 Jan. 31, 2013

Related U.S. Application Data

(60) Provisional application No. 61/513,124, filed on Jul. 29, 2011.

(51) Int. Cl.
| | |
|---|---|
| *F02B 63/04* | (2006.01) |
| *F03G 7/08* | (2006.01) |
| *H02K 7/18* | (2006.01) |
| *E21B 41/00* | (2006.01) |
| *E21B 17/10* | (2006.01) |

(52) U.S. Cl.
CPC .......... *H02K 7/1853* (2013.01); *E21B 41/0085* (2013.01); *E21B 17/1078* (2013.01)
USPC ............................................. 290/1 R

(58) Field of Classification Search
CPC .... H02K 7/1853; H02K 7/18; E21B 41/0085; E21B 17/1078
See application file for complete search history.

(56) References Cited

U.S. PATENT DOCUMENTS

| | | |
|---|---|---|
| 552,025 A | 12/1895 | Whitney |
| 5,113,953 A | 5/1992 | Noble |
| 5,265,682 A | 11/1993 | Russell et al. |
| 5,517,464 A | 5/1996 | Lerner et al. |
| 5,553,678 A | 9/1996 | Barr et al. |
| 5,553,679 A | 9/1996 | Thorp |
| 5,582,259 A | 12/1996 | Barr |
| 5,603,385 A | 2/1997 | Colebrook |
| 5,673,763 A | 10/1997 | Thorp |
| 5,685,379 A | 11/1997 | Barr et al. |
| 5,695,015 A | 12/1997 | Barr et al. |
| 5,706,905 A | 1/1998 | Barr |
| 5,778,992 A | 7/1998 | Fuller |
| 5,803,185 A | 9/1998 | Barr et al. |
| 5,971,085 A | 10/1999 | Colebrook |
| 6,089,332 A | 7/2000 | Barr et al. |

(Continued)

OTHER PUBLICATIONS

Pelrine, et al., "Dielectric elastomers: generator mode fundamentals and applications", Proc. SPIE 4329, Smart Structures and Materials 2001: Electroactive Polymer Actuators and Devices, vol. 148, Jul. 16, 2001, pp. 148-156.

(Continued)

*Primary Examiner* — Javaid Nasri
(74) *Attorney, Agent, or Firm* — Bridget Laffey; Jakub M. Michna

(57) ABSTRACT

The subject disclosure relates to energy harvesting. More particularly, the subject disclosure relates to harvesting energy from the relative motion between a rotary stabilizer and the drill string. In further embodiments, the subject disclosure relates to harvesting energy from vibrations in the drill string.

15 Claims, 6 Drawing Sheets

(56) References Cited

U.S. PATENT DOCUMENTS

| | | |
|---|---|---|
| 6,092,610 A | 7/2000 | Kosmala et al. |
| 6,158,529 A | 12/2000 | Dorel |
| 6,244,361 B1 | 6/2001 | Comeau et al. |
| 6,364,034 B1 | 4/2002 | Schoeffler |
| 6,394,196 B1 | 5/2002 | Fanuel et al. |
| 6,401,842 B2 | 6/2002 | Webb et al. |
| 7,199,480 B2 | 4/2007 | Fripp et al. |
| 7,208,845 B2 | 4/2007 | Masters et al. |
| 7,400,262 B2 | 7/2008 | Chemali et al. |
| 7,999,402 B2 | 8/2011 | Freeland et al. |
| 8,179,278 B2* | 5/2012 | Shakra et al. ............ 340/854.4 |
| 2001/0052428 A1 | 12/2001 | Larronde et al. |
| 2010/0194117 A1 | 8/2010 | Pabon et al. |
| 2011/0115222 A1 | 5/2011 | Parker et al. |
| 2012/0228875 A1* | 9/2012 | Hardin et al. ................ 290/52 |

OTHER PUBLICATIONS

Trimble, et al., "A Device for Harvesting Energy From Rotational Vibrations", J. Mech. Des., vol. 132 (9), 2010, 6 pages.

Trimble, A.Z., "Downhole Vibration Sensing by Vibration Energy Harvesting", Thesis (S.M.), Massachusetts Institute of Technology, Jun. 2007, 109 pages.

* cited by examiner

HARVESTING ENERGY FROM A DRILLSTRING

CROSS-REFERENCE TO RELATED APPLICATION

This application claims benefit of U.S. Provisional Patent Application Ser. No. 61/513,124 filed Jul. 29, 2011, which is incorporated herein by reference in its entirety.

FIELD

The subject disclosure generally relates to harvesting energy. More particularly, the subject disclosure relates to harvesting energy from a drill string.

BACKGROUND

Wells are generally drilled into the ground to recover natural deposits of hydrocarbons and other desirable materials trapped in geological formations in the Earth's crust. A well is typically drilled using a drill bit attached to the lower end of a drill string. The well is drilled so it penetrates the subsurface formations containing the trapped materials for recovery of the trapped materials. The bottom end of the drill string conventionally includes a bottom-hole assembly that has sensors, control mechanisms, and associated circuitry and electronics. As the drill bit is advanced through the formation, drilling fluid (e.g., drilling mud) is pumped from the surface through the drill string to the drill bit. The drilling fluid exits the drill bit and returns to the surface. The drilling fluid cools and lubricates the drill bit and carries the drill cuttings back to the surface. Electrical power is typically used to operate the sensors, circuitry and electronics in the bottom-hole assembly. Electrical power is conventionally provided by batteries in the bottom-hole assembly. Drawbacks to batteries include maintaining a charge in the batteries. Electrical power has also been conventionally provided by pipe internal mud flow, which may be directed through a turbine with an alternator. Drawbacks to the turbine include location of the turbine in the center of the mud flow, which will not allow downhole tools to pass the turbine.

Consequently, there is a need for an improved method of providing electrical power downhole.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment of the subject disclosure, an apparatus for converting kinetic energy to electrical energy is disclosed. In embodiments, the apparatus comprises a drill string and a rotary bearing attaching a stabilizer to the drill string. The rotary bearing permits rotation of the stabilizer with respect to the drill string and an energy harvesting device is configured to convert energy as a result of the stabilizer rotating with respect to the drill string.

In a further embodiment of the subject disclosure, a drilling system for drilling a wellbore from the surface is disclosed. The drilling system comprises a drill string including a telemetry system. The telemetry system comprises a plurality of repeaters and an energy harvesting device configured to convert and store energy. The energy is harvested from vibrations in the drill string using relative motion between a first component and a second component wherein the first component is fixedly attached to a drill string and the second component is attached to an inertial mass that can rotate with respect to the drill string.

In embodiments of the subject disclosure, a method for converting kinetic energy to electrical energy is disclosed. The method comprises attaching a stabilizer to a drill string with a rotary bearing, rotating the stabilizer with respect to the drill string and using an energy harvesting device to convert energy as a result of the stabilizer rotating with respect to the drill string.

In a further embodiment of the subject disclosure, a method of harvesting energy from a drill string is disclosed. The method comprises harvesting energy from vibrations in the drill string using relative motion between a first component and a second component wherein the first component is fixedly attached to a drill string and the second component is attached to an inertial mass that can rotate with respect to the drill string and using the harvested energy to power a telemetry system on the drill string.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

As used herein, the term stabilizer is a section of a drillstring which has a larger outer diameter than its immediate neighboring sections. While a stabilizer is usually placed in the drillstring to provide stability to the drilling operation, this functionality is not essential to the subject disclosure and the stabilizer may be utilized purely for generating downhole power.

Embodiments of the subject disclosure comprise a stabilizer-drill string connection. Further, the mechanical design of the stabilizer-drill string connection is configured to allow relative rotational motion between the stabilizer and drill string. Under the dynamical loading conditions of the downhole drilling environment (e.g., stabilizer-formation contact forces, hydrodynamic forces) the stabilizer rotates with respect to the drill string during normal operations. Embodiments of the subject disclosure utilize electromechanical systems, such as an electromagnetic generator, to harvest the mechanical power in this motion which may be used in aspects of the drilling operations, in non-limiting examples, logging while drilling, measurements while drilling and communications systems within the bottom hole assembly or to the surface. A distinct advantage of the subject disclosure is that power is generated at any desired location on the drill string, in non-limiting examples, in the vicinity of a drill bit where it may be desirable to place downhole sensors which may aid in the drilling operations or in a distributed fashion along the drillstring where it may aid in powering repeaters for wired or wireless telemetry.

Figure 1:
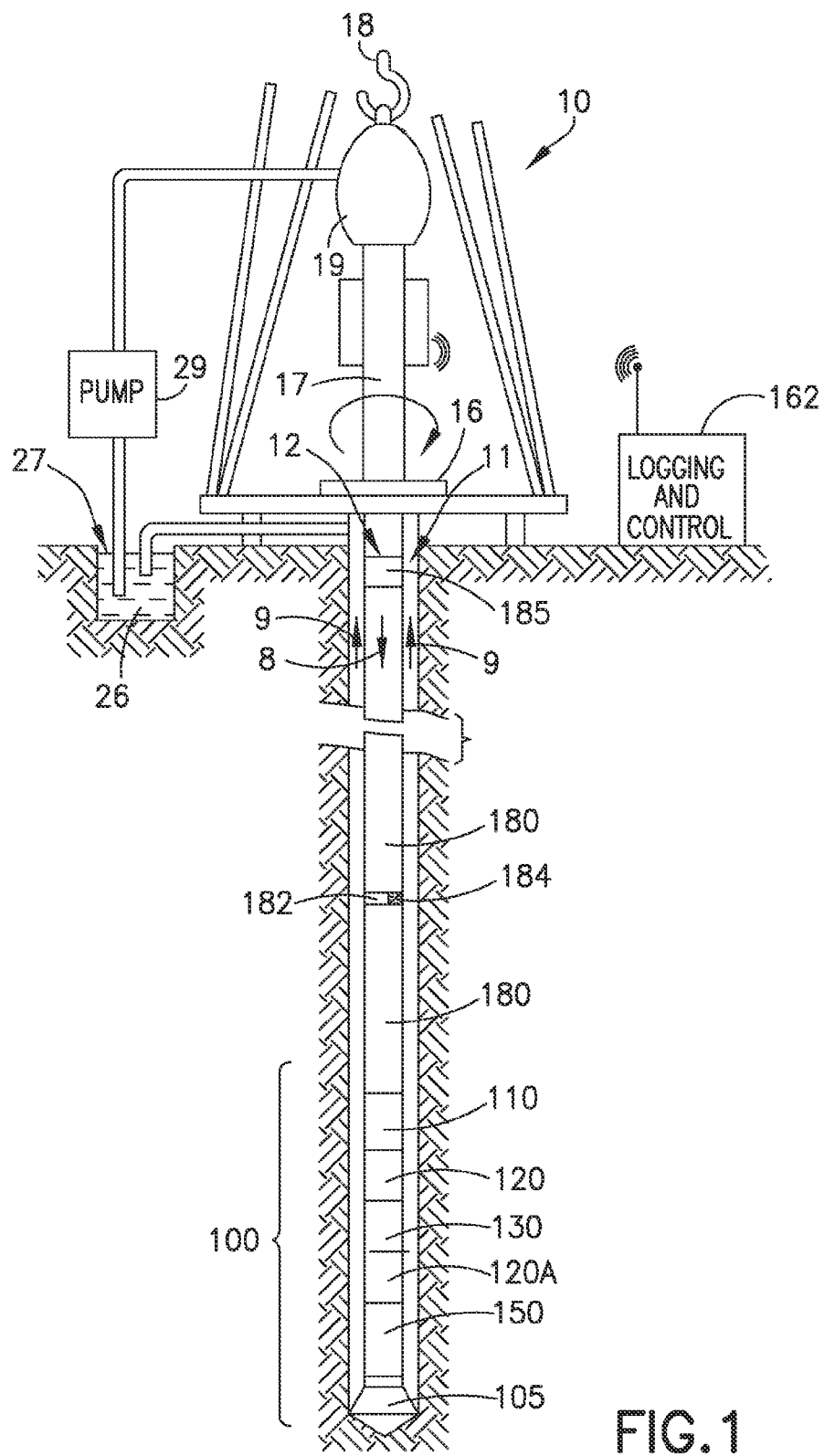
FIG. 1 illustrates a wellsite system in which the present invention can be employed.

FIG. 1 illustrates a wellsite system in which the present invention can be employed. The wellsite can be onshore or offshore. In this system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment depicts a logging-while-drilling (LWD) module 120, a measuring-while-drilling (MWD) module 130, a roto-steerable system and motor and a drill bit 105.

The LWD module 120 is housed in a special type of drill collar, as is known in the art, and can contain one or a plurality of known types of logging tools. It will also be understood that more than one LWD and/or MWD module can be employed, e.g., as represented at 120A. (References, throughout, to a module at the position of 120 can alternatively mean a module at the position of 120A as well.) The LWD module includes capabilities for measuring, processing, and storing information, as well as for communicating with the surface equipment.

The MWD module 130 is also housed in a special type of drill collar, as is known in the art, and can contain one or more devices for measuring characteristics of the drill string and drill bit. THE MWD tool may include an electronic sensor package and a mud pulse or mud flow wellbore telemetry device. The MWD further includes an apparatus (not shown) for generating electrical power to the downhole system. This may include a mud turbine generator powered by the flow of the drilling fluid, it being understood that other power and/or battery systems may be employed including embodiments of the subject disclosure. In the subject disclosure, the MWD module includes one or more of the following types of measuring devices: a weight-on-bit measuring device, a torque measuring device, a vibration measuring device, a shock measuring device, a stick slip measuring device, a direction measuring device, and an inclination measuring device.

In the subject disclosure, a drill string telemetry system is employed, which in the illustrated embodiment, comprises a system of inductively coupled wired drill pipes 180 that extend from a surface sub 185 to an interface sub 110 in the bottom hole assembly. Depending on factors including the length of the drill string, relay subs or repeaters can be provided at intervals in the string of wired drill pipes, an example being represented at 182. The repeaters can also be provided with sensors 184.

Figure 2A:
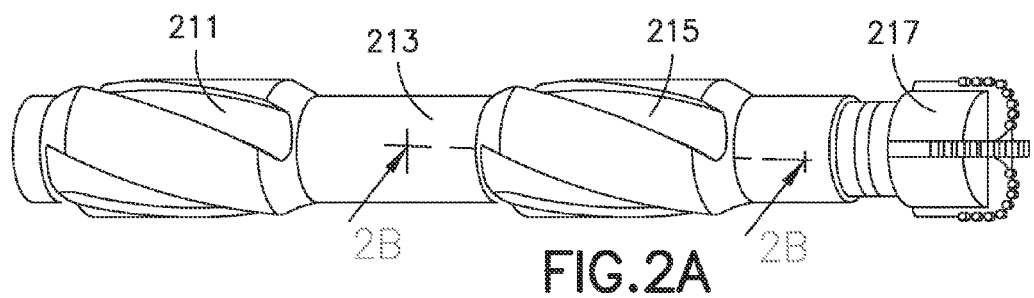
FIGS. 2A and 2B illustrates one embodiment of the subject disclosure.
Figure 2B:
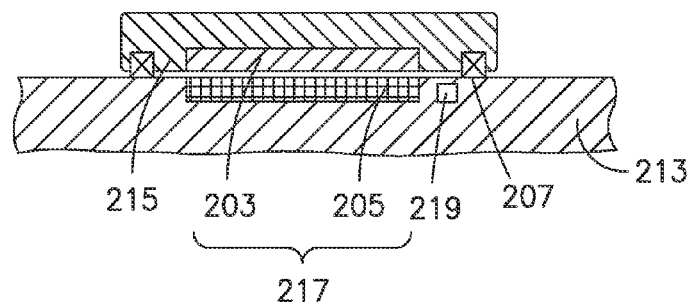

FIG. 2A illustrates one embodiment of the drill string (12) of FIG. 1. FIG. 2A illustrates a drill string (213) with a drill bit (217). Drill string (213) comprises a fixed stabilizer (211) and a rotary stabilizer (215) which rotates with respect to the drill string. The mechanical design of the rotary stabilizer (215)—drill string (213) connection allows for relative rotational motion between the two bodies. During regular drilling operations, the rotary stabilizer (215) rotates at a slower average speed than the rest of the drill string due to dynamic forces including the contact forces between the rotary stabilizer (215) and the formation. The relative rotational motion of the rotary stabilizer (215) with respect to the drillstring (213) is used to generate energy which is then utilized to power various downhole tools. Referring to FIG.2B, which is a cross-section of a portion of FIG. 2A, the relative rotational motion is accomplished by use of rotary bearings (207) which are used to attach the rotary stabilizer (215) on the drill collar (213). Non-limiting examples of rotary bearings (207) include rolling contact, journal or brushing type. Under the dynamical loading conditions of the downhole drilling environment (e.g., stabilizer-formation contact forces, hydrodynamic forces) the stabilizer rotates with respect to the drill string during normal operations. The relative rotational movement of the stabilizer represents mechanical (i.e., kinetic) energy, which is harvested by conversion to another energy domain, in non-limiting examples, electrical or chemical. This generated energy may be used or stored for subsequent use in an energy storage module (219).

In an embodiment of the subject disclosure the mechanical energy of rotation is converted to electrical energy by the use of an energy conversion module (217) which comprises in one non-limiting example, permanent magnets (203) on the rotary stabilizer (215) and windings/coils (205) on the drill string (213). It should be noted that the permanent magnets (203) may be located on the drill string (213) and the windings/coils on the rotary stabilizer (215). The relative motion between the magnets and the coils induces an electric current on the coils as governed by Faraday's Law. The electric energy that results from this conversion can be used in a nearby component, in a non-limiting example to power one or more sensors in the drillstring. The electric energy that results from this conversion may also be stored in the energy storage module 219, non-limiting examples of the energy storage module 219 include a capacitor, supercapacitor or as chemical energy in a battery. Other forms of converting mechanical energy into electrical energy include piezoelectric components or dielectric elastomer generators. See, e.g., "Dielectric elastomers: Generator mode fundamentals and applications", Smart Structures and Materials 2001: EPAD, Proceedings of SPIE Vol. 4329, for an explanation of dielectric elastomer generators. Piezoelectric materials generate a current in energy harvesting systems in response to mechanical deformation. These materials can be utilized in a similar manner to electromagnetic transducers (coils and magnets).

Figure 3:
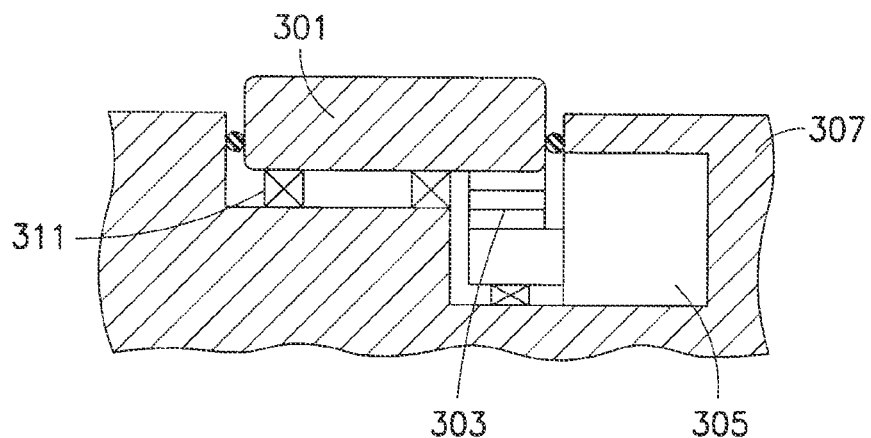
FIG. 3 illustrates an alternative embodiment of the subject disclosure.

FIG. 3 depicts a further embodiment of the subject disclosure. A drill string (307) comprises a rotary stabilizer (301). Rotary bearings (311) are used to fix the rotary stabilizer (301) on the drill string (307). A gearbox (303) between the rotary stabilizer (301) and the energy converting components (305) is used to increase the electromechanical energy conversion efficiency. This is accomplished by stepping up the rotational speed of the generator by utilizing gear ratios in the gearbox. This method can result in the operation of the electromagnetic generator in a more efficient rotational speed. One non-limiting example of a gearbox (303) is a planetary gear set but other gearboxes are contemplated for use with the subject disclosure. The energy converting components, in one non-limiting example, include an electromagnetic generator.

For operational concerns, such as preventing tool sticking, it is desirable to have all sections of the drill string rotating. In the event of sticking, the rotary stabilizers may be the portion of the drill string which may be the most difficult to "unstick" because of the limited torque that may be applied to the embodiments disclosed. Embodiments of the subject disclosure may comprise a fail-safe mechanism to "unstick" in the event of sticking This fail-safe mechanism may be activated by a surface manipulation, in one non-limiting example, the stabilizers are mechanically fixed to the drill string and are torqued away from the stuck interface.

Figure 4A:
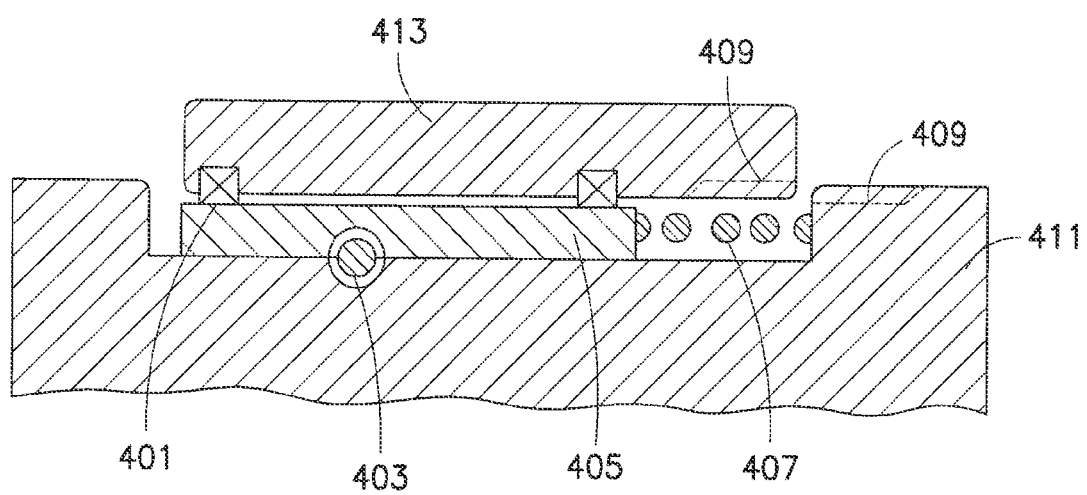
FIG. 4A-4C illustrates an embodiment of the subject disclosure.
Figure 4B:
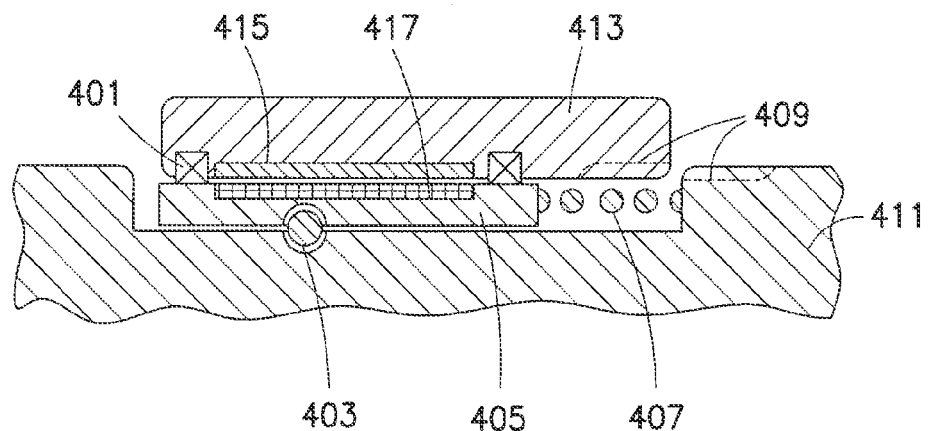
Figure 4C:
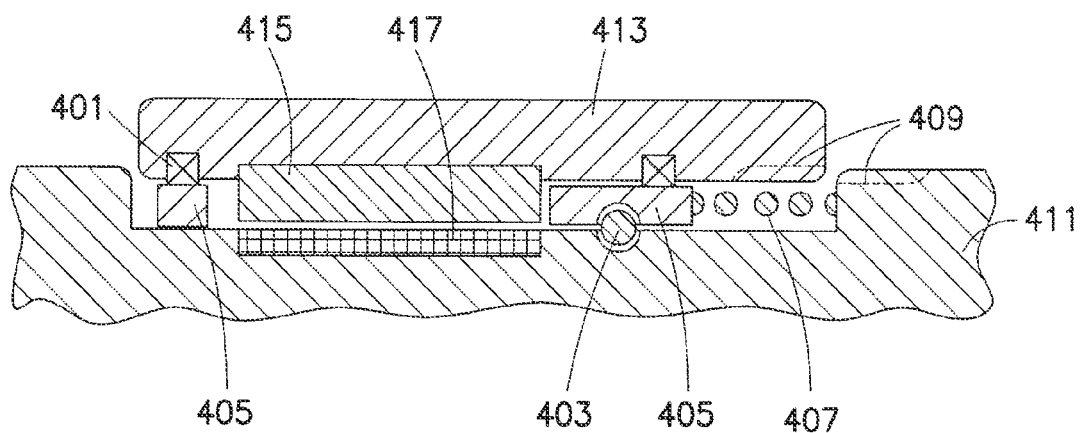

FIG. 4A-4C depicts an embodiment of the subject disclosure which allows torque transfer to the rotary stabilizer (413) on the drill string (411). Bearings (401) are used to fix the rotary stabilizer (413) on the rotary stabilizer carriage (405). A spline arrangement (409) may be formed between the drill string (411) and the stabilizer (413) which comprises a first and a second spline component profile (409) capable of mating. In order to engage the mating spline profiles (409), the drill string (411) is tensioned to overcome the resistive force of a shear pin (403) or a spring (407) or both a shear pin (403) and a spring (407). The torque applied to the drill string (411) from the surface is used to assist in un-sticking the rotary stabilizer (413). If the rotary stabilizer (413) is stuck, tension can be applied to the drill string (411) such that the mating spline profiles (409) engage and allow for torque to be transferred to the rotary stabilizer (413) to assist in un-sticking. In embodiments of the subject disclosure, the mating spline profiles (409) are kept apart by the use of compression springs or shear pins. As discussed above, only one of the compression spring or shear pin may be needed for the fail-safe operation. The rotary stabilizer carriage (405) is normally designed to not rotate independent of the drill string (411).

Magnets or coils may be placed on the rotary stabilizer carriage (405), thus making the rotary stabilizer carriage (405) an integral part of energy generation. FIG. 4B depicts the coils (417) on the rotary stabilizer carriage (405) and the magnets (415) on the rotary stabilizer (413). In an alternative embodiment, the magnets (415) may be located on the rotary stabilizer carriage (405) and the coils (417) on the rotary stabilizer (413). Alternatively, the magnets or coils may be placed on the drill string (411) as depicted in FIG. 4C. In this alternate embodiment, two rotary stabilizer carriages may be used, an upper and a lower stabilizer carriage (405) as depicted in FIG. 4C, one for each bearing (401). In the embodiment in FIG. 4C, the magnets are located on the rotary stabilizer (413) and the coils are located on the drill string (411); however, the alternative disposition of these components is also possible.

Energy generated from embodiments of the subject disclosure may be utilized for powering downhole tools. In non-limiting examples, these tools may be measurement while drilling tools, logging while drilling tools, wireless electromagnetic telemetry and wired telemetry e.g., wired drill pipe repeaters and mud-pulse telemetry. A more detailed description of a known wellbore telemetry system may be found in U.S. Pat. No. 5,517,464, which is incorporated by reference herein in its entirety.

Figure 5:
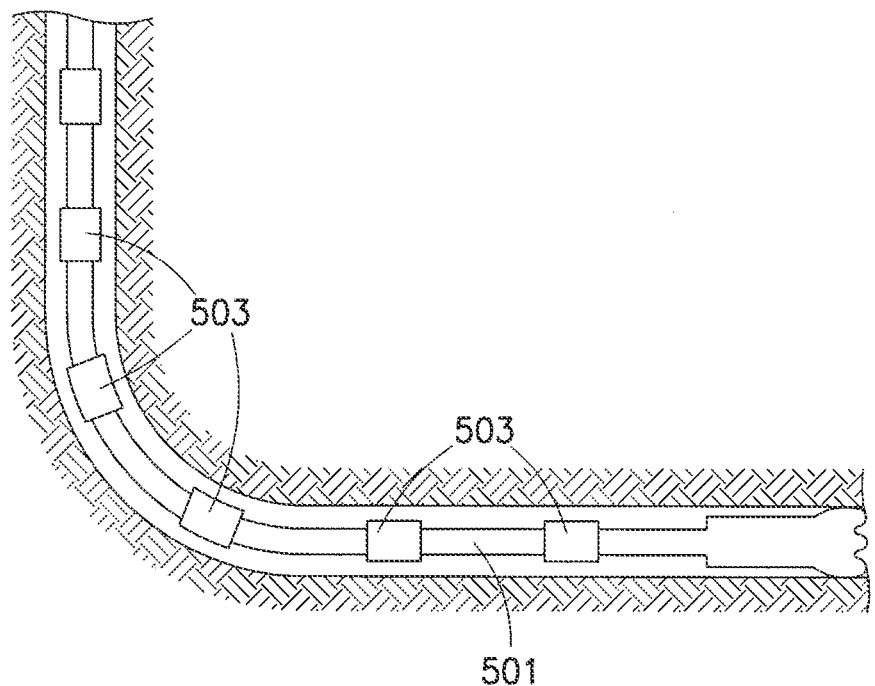
FIG. 5 illustrates distributed energy harvesting on a drill string.

FIG. 5 depicts an example of a downhole use of energy harvesting. FIG. 5 depicts a drill string (501) comprising a plurality of rotary stabilizers (503) as discussed above. The plurality of rotary stabilizers provides a distributed energy harvesting network on the drill string (501). This distributed energy harvesting network on the drill string (501) may be used to power repeaters of wired or wireless telemetry. In wired electrical and wireless electromagnetic or pressure-pulse telemetry systems a challenge faced is the attenuation of the signal between the bottom-hole assembly and the surface. In an embodiment of the subject disclosure a plurality of rotary stabilizers (503) is distributed along the drill string (501). Each rotary stabilizer comprises an energy harvesting module as discussed above. The communication signal propagating through the wired drill string (501) attenuates because of various reasons. To extend the distance at which this communication takes place, repeaters are placed along the drill string (501).

Figure 6:
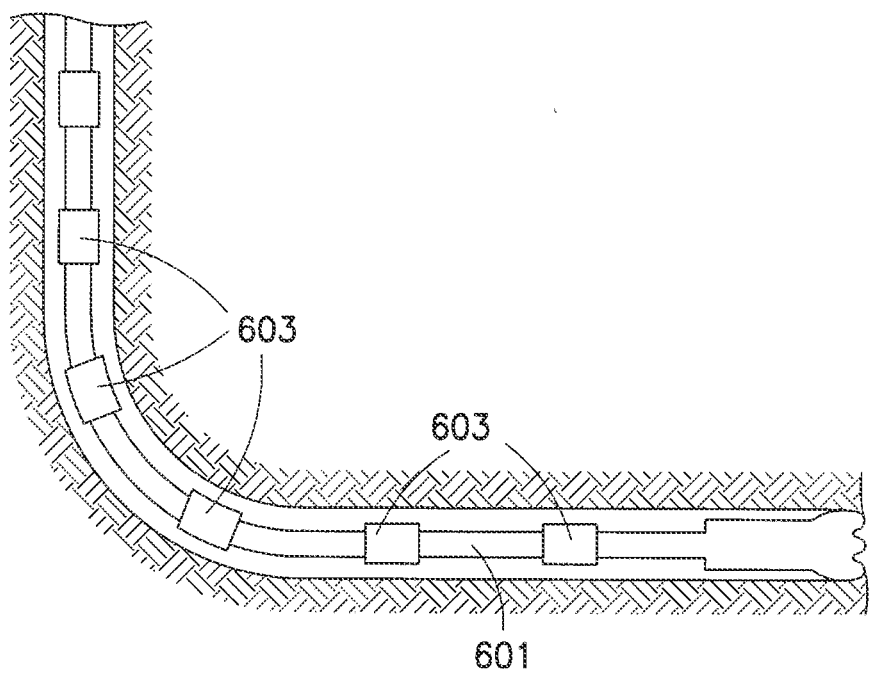
FIG. 6 illustrate wired drill pipe repeaters which are used for transmitting communication signals through a drillstring.

FIG. 6 depicts a drill string (601) with a plurality of wired drill pipe repeaters (603) which may be used for transmitting communication signals through the drill string (601). The repeaters (603) are placed along the drill string (601) which may receive a communication signal, amplify the communication signal, and in turn transmit it to the next receiver which may or may not be located in a repeater, a bottom-hole assembly or a surface system. The electrical power may be stored in batteries for a short duration. In embodiments of the subject disclosure, the time limit is extended or completely removed since the repeaters (603) may harvest readily available mechanical energy to power its electronics. Each harvesting module of the rotary stabilizer (503) powers a signal repeater which receives a signal from a transmitting node and amplifies it such that the next receiver can acquire the signal.

Figure 7A:
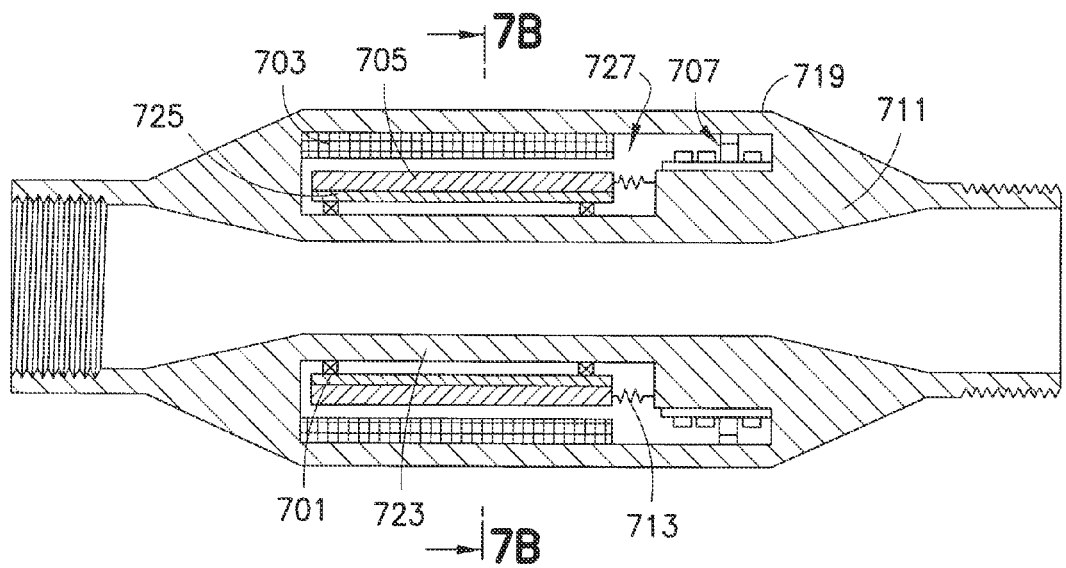
FIGS. 7A and 7B illustrates a vibrational energy harvester.
Figure 7B:
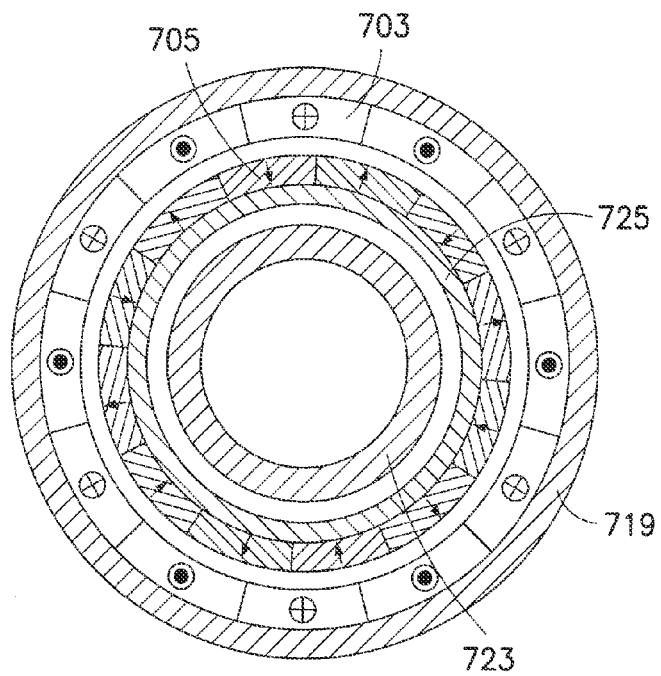

In a further embodiment, repeaters (603) harvest vibrational energy from a drill string (601) using an inertial mass. The annular inertial element (725) is located within the energy harvester and may contain permanent magnets and coils as depicted in FIGS. 7A and 7B. If the inertial element (725) contains magnets, coils are placed fixed to the body of the harvester, or vice versa. In either configuration, the vibration creates a relative rotational motion between the magnets and the coils, changing the magnetic flux linked through the coils and causing a voltage across the wire terminations of the coil. This electrical energy is harvested using dedicated electronics.

FIGS. 7A and 7B depicts a vibrational energy harvester. FIG. 7A shows a drill collar module (711) that comprises an energy harvesting module (727). In embodiments of the subject disclosure the energy harvesting module (727) comprises energy harvesting and rectification electronics (707). An annular inertial element (725) is located within the energy harvester and contains the magnet assembly (705). Bearings (701) attach the annular inertial element (725) and magnet assembly (705) to an inner mandrel (723) of the drill collar module (711), to allow relative rotation. A torsional spring (713) or a plurality of torsional springs attaches the magnet assembly (705) to the drill collar module (711). Coils (703) are placed fixed to the inner wall of the outer housing (719) of the drill collar module (711).

FIG. 7B depicts a cross-section of the embodiment of FIG. 7A comprising an outer housing (719), coils (703), a magnet assembly (705) with varying polarity, an inertial assembly (725) and an inner mandrel (723). As discussed above the inertial assembly (725) contains a magnet assembly (705) and the coils (703) are placed fixed to the body of the harvester. The reverse is also possible where the inertial assembly (725) contains the coils (703) and the magnet assembly (705) is fixed to the body of the harvester. Details of the energy harvesting module are disclosed in Trimble et al., entitled "A device for harvesting energy from rotational vibrations," Journal of Mechanical Design, Vol. 132, September 2010, the contents of which are herein incorporated by reference. Further, details of magnets and coils which may be used in the subject disclosure are disclosed in U.S. Patent Publication No. 2010/0194117 A1, entitled "Electromagnetic device having compact flux paths for harvesting energy from vibrations," the contents of which are herein incorporated by reference.

Similar to embodiments disclosed above the energy for the repeaters may be accomplished by placing a stabilizer on the drill string which is free to rotate. The borehole may exert a torque on the stabilizer, because of drill string tuning during regular operation, which may be harvested using the electromagnetic system described in previous embodiments.

In further embodiments, the distributed harvesting network may also be used to power collocated sensors e.g., accelerometers or pressure sensors. In further embodiments, devices of the subject disclosure may also include downhole sensors to add to logging while drilling (LWD) and measurement while drilling (MWD) information gathered during drilling.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An apparatus positioned in a wellbore for capturing energy in the wellbore comprising:
    a drill string comprising:
        a rotary bearing attaching a stabilizer to the drill string; the rotary bearing permitting rotation of the stabilizer with respect to the drill string in response to external stimuli as the drill string traverses the wellbore; and
        an energy harvesting device comprising:
            an energy conversion module having first and second components which provide electrical energy when moved relative to each other wherein the first and second components are moved relative to each other as a result of the stabilizer rotating with respect to the drill string and electrical energy is produced.

2. The apparatus of claim 1 wherein the energy harvesting device is configured to store energy in an energy storage module.

3. The apparatus of claim 2 wherein the energy storage module comprises a capacitor, supercapacitor or a battery.

4. The apparatus of claim 2 wherein the energy is used to provide power to one or more sensors in a wellbore.

5. The apparatus of claim 1 wherein the first component includes one or more coils and the second component includes one or more magnets.

6. The apparatus of claim 1 wherein the first component includes one or more magnets and the second component includes one or more coils.

7. The apparatus of claim 6 wherein the magnets are attached to the drill string.

8. The apparatus of claim 6 wherein the coils are attached to the stabilizer.

9. The apparatus of claim 6 wherein the coils are attached to the drill string.

10. The apparatus of claim 6 wherein the magnets are attached to the stabilizer.

11. The apparatus of claim 1 wherein the rotary bearing is selected from a rolling contact bearing, a journal bearing or a bushing.

12. A method for converting kinetic energy to electrical energy comprising:
    attaching a stabilizer to a drill string with a rotary bearing;
    rotating the stabilizer with respect to the drill string in response to external stimuli as the drill string traverses a wellbore; and
    moving a first and second component of an energy harvesting device relative to each other as a result of the stabilizer rotating with respect to the drill string wherein the movement provides electrical energy.

13. The method of claim 12 further comprising:
    storing the converted energy in an energy storage module.

14. The method of claim 12 wherein the first component includes one or more coils and the second component includes one or more magnets.

15. The method of claim 12 wherein the first component includes one or more magnets and the second component includes one or more coils.

* * * * *